(12) United States Patent
Barker et al.

(10) Patent No.: US 12,327,401 B2
(45) Date of Patent: Jun. 10, 2025

(54) SENSOR DATA ANNOTATION FOR TRAINING MACHINE PERCEPTION MODELS

(71) Applicant: Aurora Operations, Inc., Mountain View, CA (US)

(72) Inventors: Jeffrey William Barker, Pittsburgh, PA (US); Brendan Meeder, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 352 days.

(21) Appl. No.: 17/893,838

(22) Filed: Aug. 23, 2022

(65) Prior Publication Data

US 2024/0071060 A1    Feb. 29, 2024

(51) Int. Cl.
*G06V 10/778*    (2022.01)
*G06V 10/46*    (2022.01)
*G06V 10/774*    (2022.01)

(52) U.S. Cl.
CPC .......... *G06V 10/7788* (2022.01); *G06V 10/46* (2022.01); *G06V 10/774* (2022.01)

(58) Field of Classification Search
CPC .. G06V 10/7788; G06V 10/46; G06V 10/774; G06V 10/945; G06V 20/647
USPC .......................................................... 382/156
See application file for complete search history.

(56) References Cited

U.S. PATENT DOCUMENTS

| | | | |
|---|---|---|---|
| 2019/0143523 A1* | 5/2019 | Harel ...................... | G06F 18/23 700/259 |
| 2022/0024485 A1* | 1/2022 | Theverapperuma ... | G06V 20/58 |
| 2022/0027675 A1* | 1/2022 | Sheu .................... | G06F 18/2148 |
| 2022/0083792 A1* | 3/2022 | Naseer ................. | G06V 20/582 |
| 2022/0156533 A1* | 5/2022 | Hu ....................... | G06V 30/2504 |
| 2022/0230406 A1* | 7/2022 | Ali ......................... | G06T 17/20 |
| 2022/0268939 A1* | 8/2022 | Najmark ................ | H04L 67/12 |

OTHER PUBLICATIONS

Li et al., "DeepFusion: Lidar-Camera Deep Fusion for Multi-Modal 3D Object Detection", arXiv:2203.08195v1, Mar. 15, 2022, 12 pages.
Piergiovanni et al., "4D-Net for Learned Multi-Modal Alignment", arXiv:2109.01066v1, Sep. 2, 2021, 15 pages.

* cited by examiner

*Primary Examiner* — Ali Bayat
(74) *Attorney, Agent, or Firm* — Dority & Manning, P.A.

(57) ABSTRACT

Example aspects of the present disclosure relate to an example computer-implemented method for data annotation for training machine perception models. The example method can include (a) receiving source sensor data descriptive of an object, the source sensor data having a source reference frame of at least three dimensions, wherein the source sensor data includes annotated data associated with the object; (b) receiving target sensor data descriptive of the object, the target sensor data having a target reference frame of at least two dimensions; (c) providing an input to a machine-learned boundary recognition model, wherein the input includes the target sensor data and a projection of the source sensor data into the target reference frame; and (d) determining, using the machine-learned boundary recognition model, a bounded portion of the target sensor data, wherein the bounded portion indicates a subset of the target sensor data descriptive of the object.

26 Claims, 13 Drawing Sheets

SENSOR DATA ANNOTATION FOR TRAINING MACHINE PERCEPTION MODELS

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The present disclosure is directed to a training pipeline that can automatically label or otherwise annotate sensor datasets by leveraging context from other sensors. In some implementations, a boundary recognition model in the training pipeline can process and annotate target sensor data in view of source sensor data. For example, the source sensor data can include annotated ground-truth sensor data for training a machine-learned model (e.g., a machine-learned perception model). The source sensor data can include annotated data with labels or other indicia of an object perceived by a source sensor. The target sensor data can describe the same object as perceived by a different sensor. In some examples, the target sensor data can have a lower dimensionality than the source sensor data. For instance, some example implementations can use labeled three-dimensional source sensor data (e.g., point clouds) to provide context for labeling two-dimensional target sensor data (e.g., images).

Advantageously, some implementations of a training pipeline can leverage the semantic information associated with the source sensor data to automatically generate annotations for the target sensor data. In some implementations, annotations can include an outline of the object, a bounding box around the object, measurements associated with the object, etc. In some implementations, a training pipeline can project three-dimensional point cloud data points depicting an object into a two-dimensional space. A machine-learned boundary recognition model can use the two-dimensional projection as context to process and annotate a two-dimensional image of the object. For instance, the machine-learned boundary recognition model can, for example, receive the image as an input along with the two-dimensional projection and output data descriptive of a bounding box around the depiction of the object in the image.

Example systems and methods of the present disclosure can provide improvements for efficiently generating quality data labels for ground-truth datasets for training improved machine-learned machine perception models. In some examples, machine-learned systems can provide improved sensor processing capabilities when trained using ground truth datasets for the outputs of multiple different sensor configurations. For instance, in the example context of an autonomous vehicle, a machine-learned perception system can be used to interpret point cloud data as well as image data. Training data for training the perception system can include, for example, labeled ground-truth point clouds and labeled images.

Existing approaches to generating annotations for obtaining ground-truth datasets typically require independent labeling of each sensor's output data, such that an object captured by multiple different sensor configurations would need to be manually identified and annotated for each different sensor configuration. This traditional approach can lead to significant duplication of labor and substantial review overhead in processing sensor data to generate ground truth datasets.

In contrast to traditional approaches, example training pipelines of the present disclosure can leverage existing annotations from already-labeled higher dimensional data (e.g., labeled point clouds) to provide for automated annotation of lower dimensional data (e.g., images). In this manner, for instance, the resources invested to curate and annotate the higher-dimensional data can automatically provide benefit to the annotation of the lower-dimensional data.

Example implementations of a data annotation pipeline leveraging multimodal sensor data according to the present disclosure can provide for a number of technical effects and benefits. Increasing the efficiency with which ground-truth datasets are generated can decrease the amount of resources consumed in their production (e.g., computational resources, such as memory, processing cycles, etc.; natural resources, such as those used to generate electricity; etc.). In turn, more efficient generation of ground-truth datasets can provide for greater quantity and improved quality of training datasets for better training machine-learned models, thereby providing for improved machine-learned models. For instance, by more efficiently generating ground-truth image data, example implementations of a data labeling pipeline can generate more ground-truth image data (e.g., at higher frame rates, with more variety, etc.) to better train machine-learned perception models (e.g., for autonomous vehicles). This can ultimately lead to improved performance of the systems that implement the trained models, such as autonomous vehicles.

For example, in an aspect, the present disclosure provides an example computer-implemented method for data annotation using multimodal sensor data. The example method can include (a) receiving source sensor data descriptive of an object, the source sensor data having a source reference frame of at least three dimensions. The source sensor data can include annotated data associated with the object. The example method can include (b) receiving target sensor data descriptive of the object, the target sensor data having a target reference frame of at least two dimensions. The example method can include (c) providing an input to a machine-learned boundary recognition model. In the example method, the input can include the target sensor data and a projection of the source sensor data into the target reference frame. The example method can include (d) determining, using the machine-learned boundary recognition model, a bounded portion of the target sensor data. In the example method, the bounded portion can indicate a subset of the target sensor data descriptive of the object.

In some implementations of the example method, the bounded portion can correspond to a bounding shape around a depiction of the object in the target sensor data. In some implementations of the example method, the bounded portion can correspond to a plurality of key points.

In some implementations of the example method, the source sensor data can include point cloud data, and the target sensor data can include two-dimensional image data. In some implementations of the example method, the point cloud data can be collected by aggregating a plurality of ranging measurements over time.

In some implementations of the example method, a first channel of the input can correspond to the target sensor data, and a second channel of the input can correspond to the projection. In some implementations of the example method, a third channel of the input can correspond to a source bounding shape around a depiction of the object in the source sensor data.

In some implementations of the example method, the method can include (e) displaying, on a graphical user interface, a representation of the bounded portion overlaid a rendering of the target sensor data. In some implementations of the example method, the graphical user interface can be configured to receive a refinement input to update the bounded portion.

In some implementations of the example method, the method can include (f) storing a data record associating the target sensor data and the source sensor data with the object.

In some implementations of the example method, the machine-learned boundary recognition model can include an image recognition model backbone.

For example, in an aspect, the present disclosure provides an example computing system for an autonomous vehicle control system training pipeline. The example system can include one or more processors and one or more non-transitory computer-readable media storing instructions executable to cause the one or more processors to perform operations. In the example system, the operations can include (a) receiving source sensor data descriptive of an object, the source sensor data having a source reference frame of at least three dimensions. In the example system, the source sensor data can include annotated data associated with the object. In the example system, the operations can include (b) receiving target sensor data descriptive of the object, the target sensor data having a target reference frame of at least two dimensions. In the example system, the operations can include (c) providing an input to a machine-learned boundary recognition model. In the example system, the input can include the target sensor data and a projection of the source sensor data into the target reference frame. In the example system, the operations can include (d) determining, using the machine-learned boundary recognition model, a bounded portion of the target sensor data. In the example system, the bounded portion can indicate a subset of the target sensor data descriptive of the object.

In some implementations of the example system, the bounded portion can correspond to a plurality of key points.

In some implementations of the example system, the source sensor data can include point cloud data, and the target sensor data can include two-dimensional image data. In some implementations of the example system, the point cloud data can be collected by aggregating a plurality of ranging measurements over time. In some implementations of the example system, a first channel of the input can correspond to the target sensor data, and a second channel of the input can correspond to the projection. In some implementations of the example system, a third channel of the input can correspond to a source bounding shape around a depiction of the object in the source sensor data.

In some implementations of the example system, the operations can include (e) displaying, on a graphical user interface, a representation of the bounded portion overlaid a rendering of the target sensor data. In some implementations of the example system, the graphical user interface can be configured to receive a refinement input to update the bounded portion.

In some implementations of the example system, the operations can include (f) storing a data record associating the target sensor data and the source sensor data with the object.

In some implementations of the example system, the machine-learned boundary recognition model can include an image recognition model backbone.

For example, in an aspect, the present disclosure provides an example autonomous vehicle control system for an autonomous vehicle. The example autonomous vehicle control system can include one or more processors and one or more non-transitory computer-readable media storing instructions executable to cause the one or more processors to perform operations. In the example autonomous vehicle control system, the operations can include (a) obtaining sensor data descriptive of an environment of the autonomous vehicle; and (b) determining, based on the sensor data and using a machine-learned perception model, a presence of an object in the environment. In the autonomous vehicle control system, the machine-learned perception model can be trained to perceive objects using training data. The training data can be generated by operations including (c) receiving training source sensor data descriptive of a training object, the training source sensor data having a training source reference frame of at least three dimensions, wherein the training source sensor data can include annotated training data associated with the training object. The training data can be generated by operations including (d) receiving training target sensor data descriptive of the training object, the training target sensor data having a training target reference frame of at least two dimensions. The training data can be generated by operations including (e) providing a training input to a machine-learned boundary recognition model, wherein the input can include the training target sensor data and a projection of the training source sensor data into the training target reference frame. The training data can be generated by operations including (f) determining, using the machine-learned boundary recognition model, a bounded portion of the training target sensor data, wherein the bounded portion can indicate a subset of the training target sensor data descriptive of the training object.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
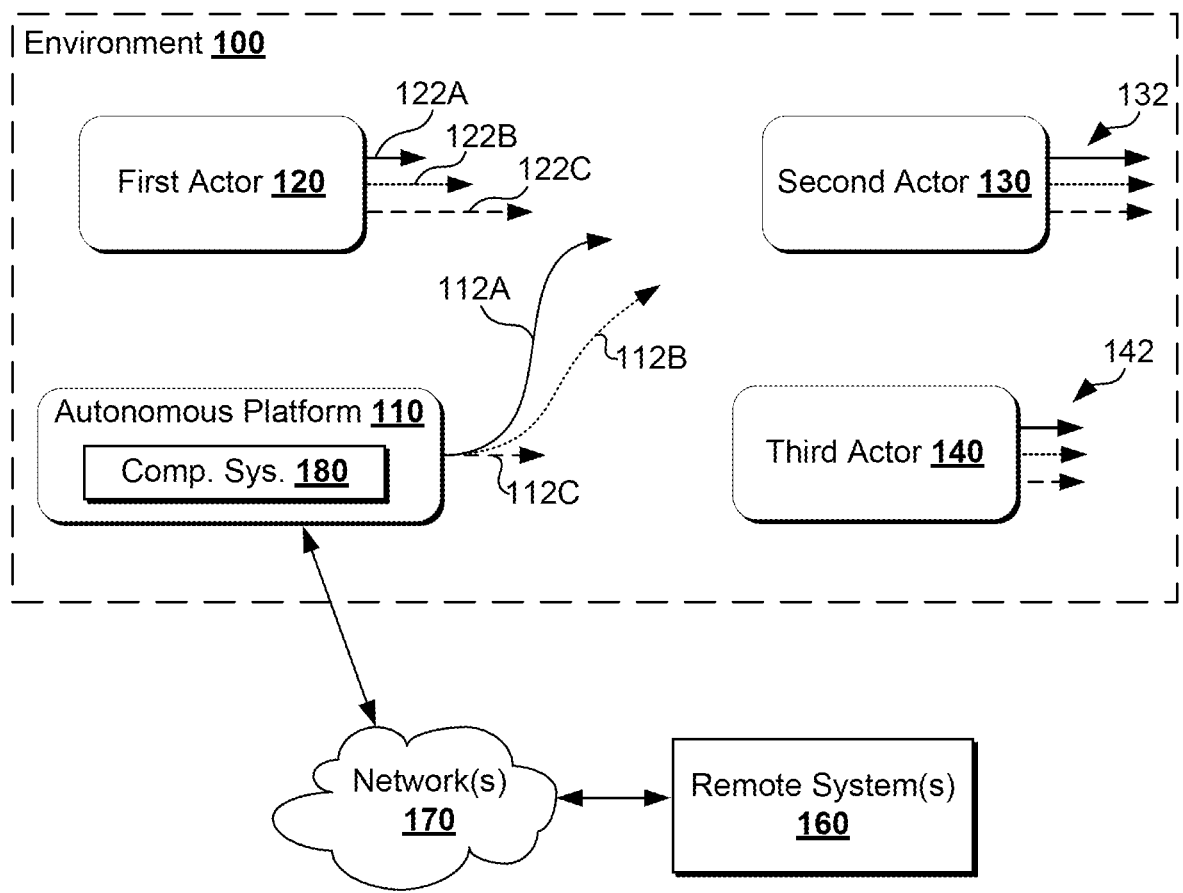
FIG. 1 is a block diagram of an example operational scenario, according to some implementations of the present disclosure.

With reference to FIGS. 1-11, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
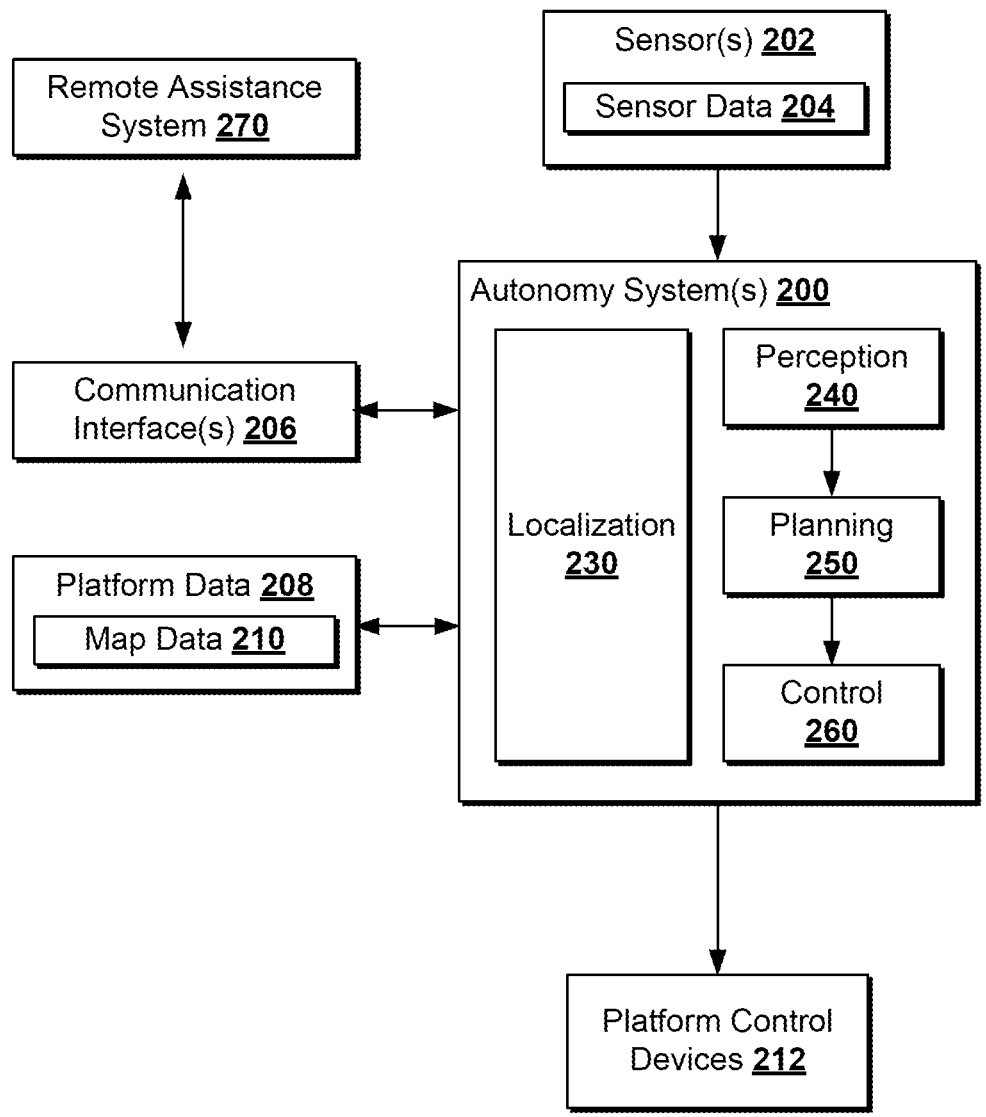
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
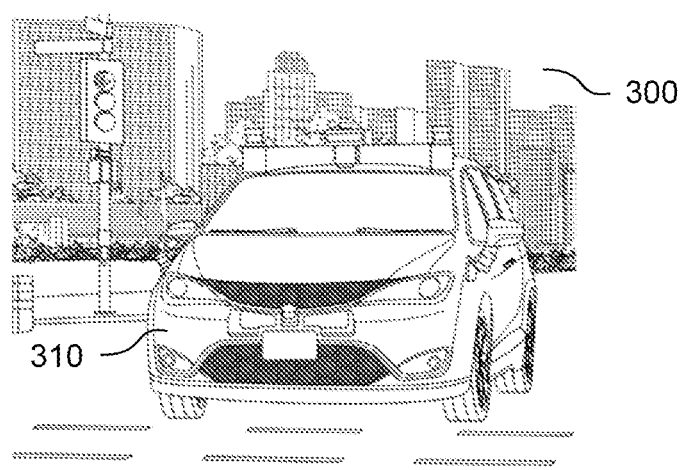
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
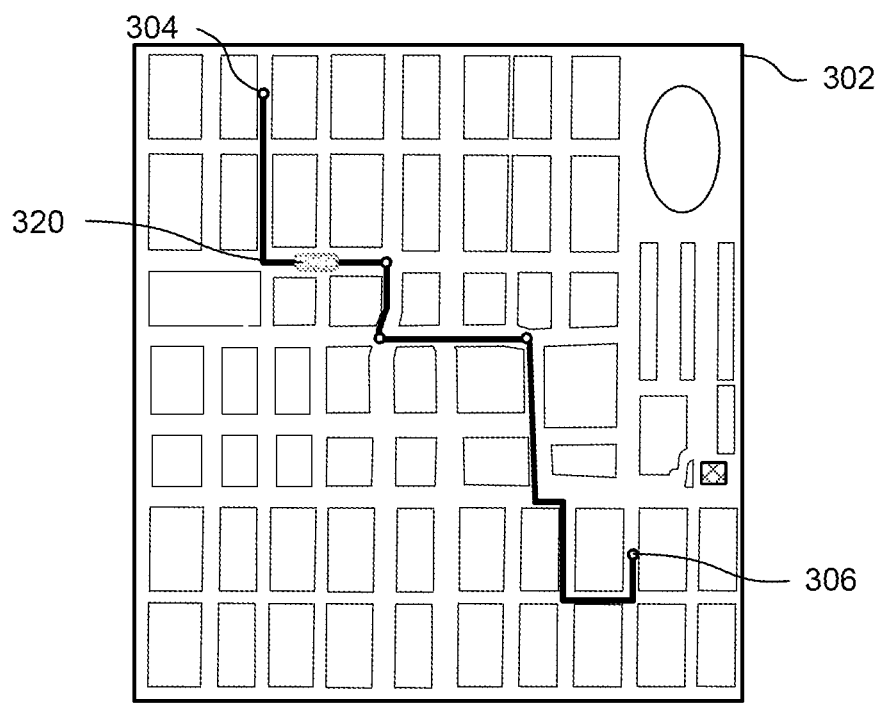
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
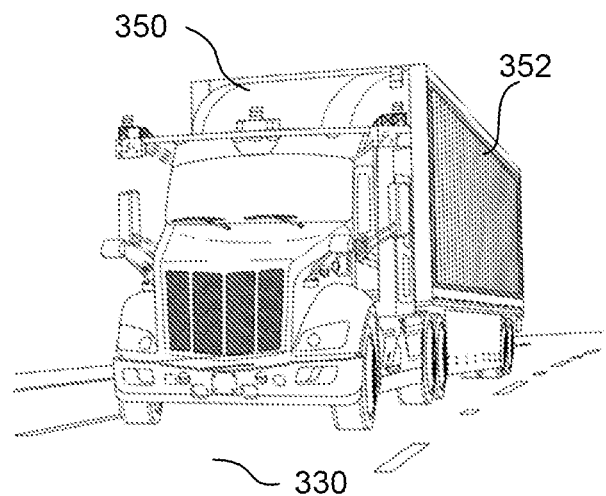
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
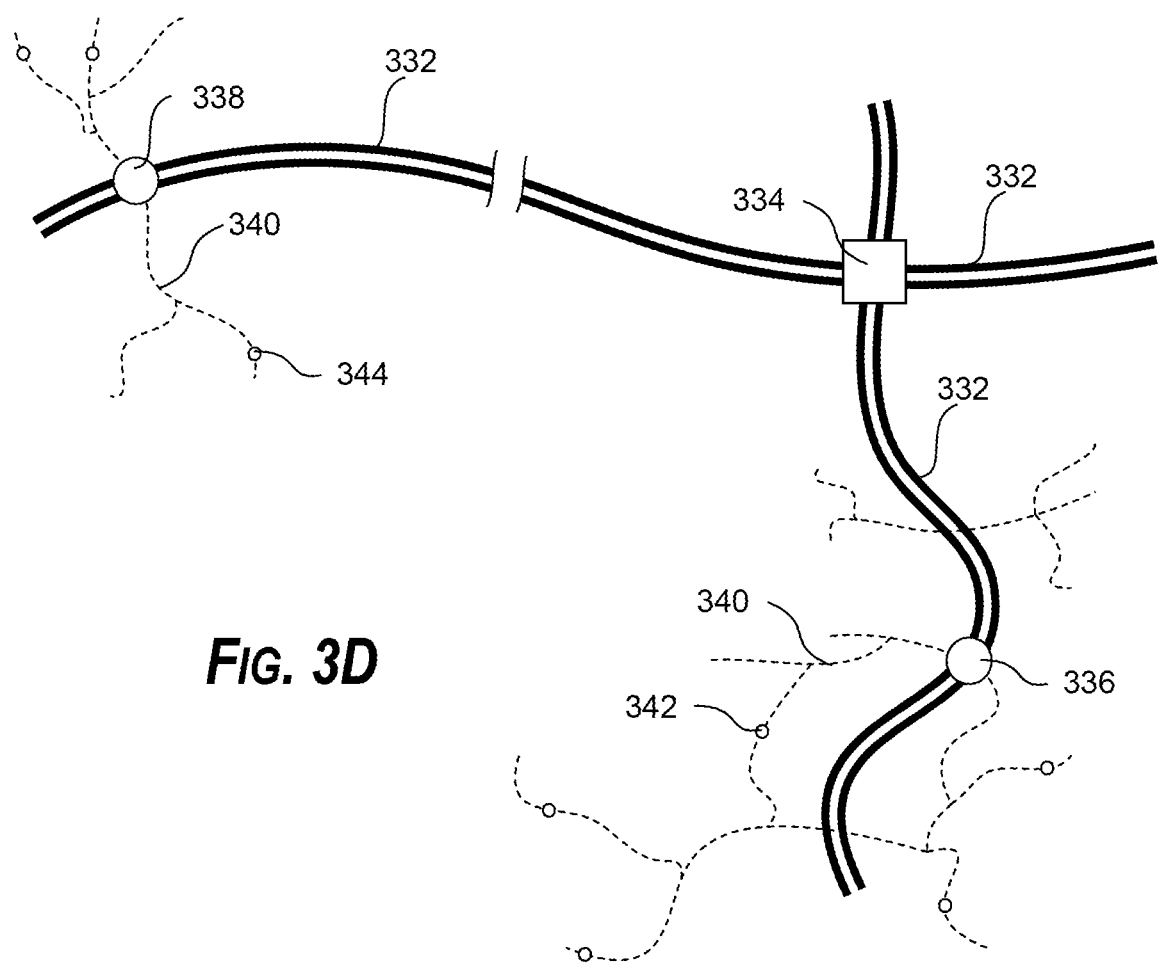
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system(s) 200 (e.g., the autonomous vehicles 310 or 350), one or more portions of the autonomy system(s) 200 can be trained using a training pipeline leveraging multimodal sensor data according to example aspects of the present disclosure. For example, in some implementations, perception system 240 can be trained using ground truth instances annotated in an automated (e.g., fully automated, partially automated, etc.) pipeline.

Figure 4:
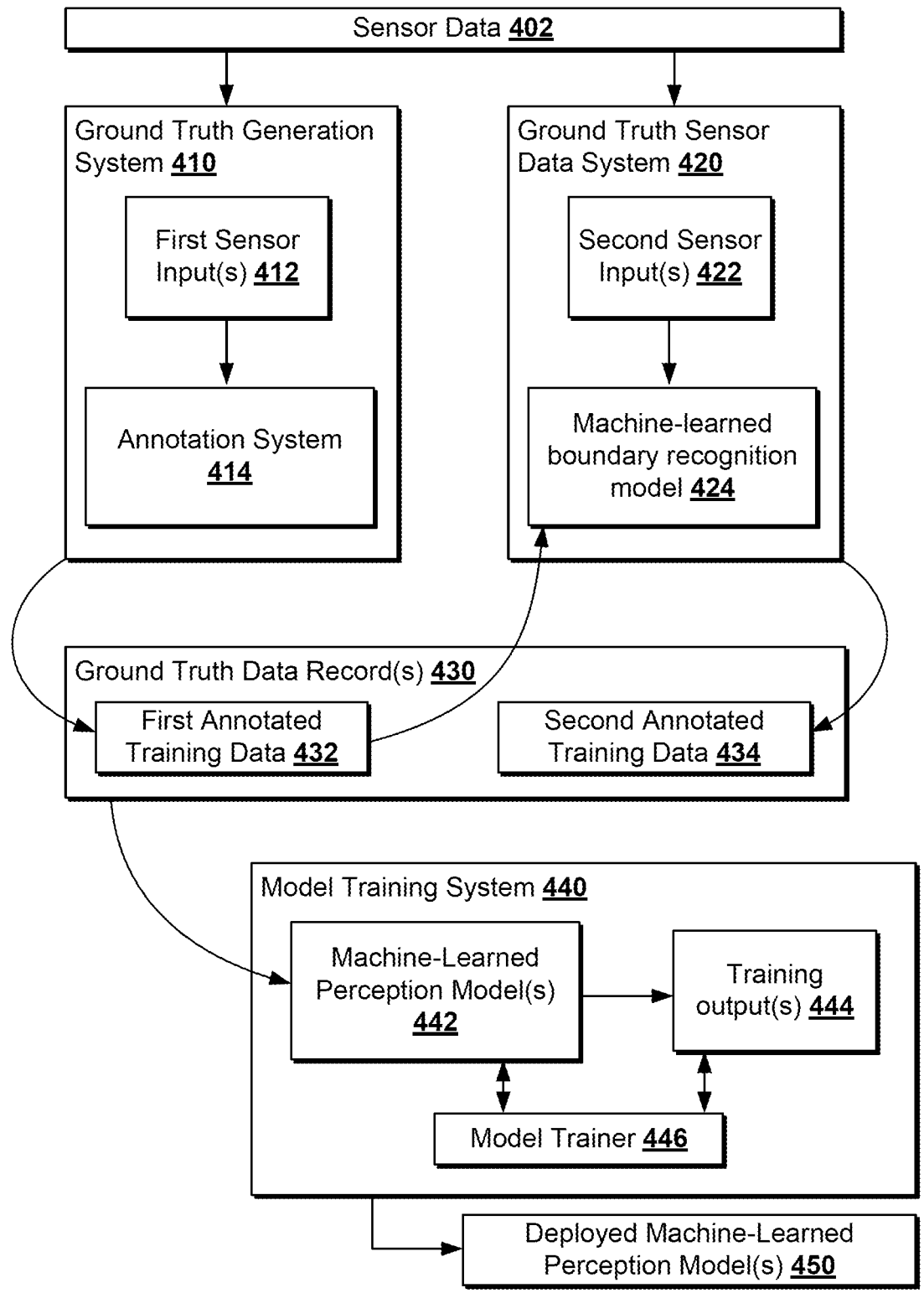
FIG. 4 is a block diagram of an example training pipeline for training machine-learned perception models, according to some implementations of the present disclosure.

FIG. 4 depicts an example training pipeline for training machine-learned perception models, according to some implementations of the present disclosure. Sensor data 402 can be fed to a ground truth generation system 410 and a ground truth sensor data system 420 to compile ground truth data record(s) 430. Ground truth data record(s) 430 can be used by a model training system 440 for training a machine-learned perception model 442 (e.g., by evaluating training output(s) 444 and updating parameters of the model using a model trainer 446) for deployment as deployed machine-learned perception model(s) 450.

The ground truth generation system 410 can provide first sensor input(s) 412 to an annotation system 414. The first sensor input(s) 412 can include, for example, point cloud data. The annotation system 414 can include a system for labeling or otherwise annotating the point cloud data in a manual, semi-automatic, or automatic process flow (e.g., manual labeling by a user through a user interface). The ground truth generation system 410 can generate first annotated training data 432 by annotating the first sensor inputs 412.

The ground truth sensor data system 420 can provide second sensor input(s) 422 to a machine-learned boundary recognition model 424. The second sensor input(s) 422 can include, for example, image data. The machine-learned boundary recognition model 424 can also receive the first annotated training data 432 as an input. Based on the inputs, the machine-learned boundary recognition model 424 can produce second annotated training data 434.

The ground truth data records 430 can be associated with a particular object. For instance, in some implementations, the ground truth data records 430 can include multiple different data types or data sets descriptive of or otherwise relating to the object. For instance, ground truth data record(s) 430 can be stored in a data structure that can be organized by association with the object, so that data descriptive of the object can be retrieved efficiently.

The first annotated training data 432 can be generated first and provided to the ground truth sensor data system 420 to aid in generating the second annotated training data 434. In this manner the resource investment into annotating the first annotated training data 432 can be leveraged to streamline and further improve the annotation of the second annotated training data 434.

Figure 5A:
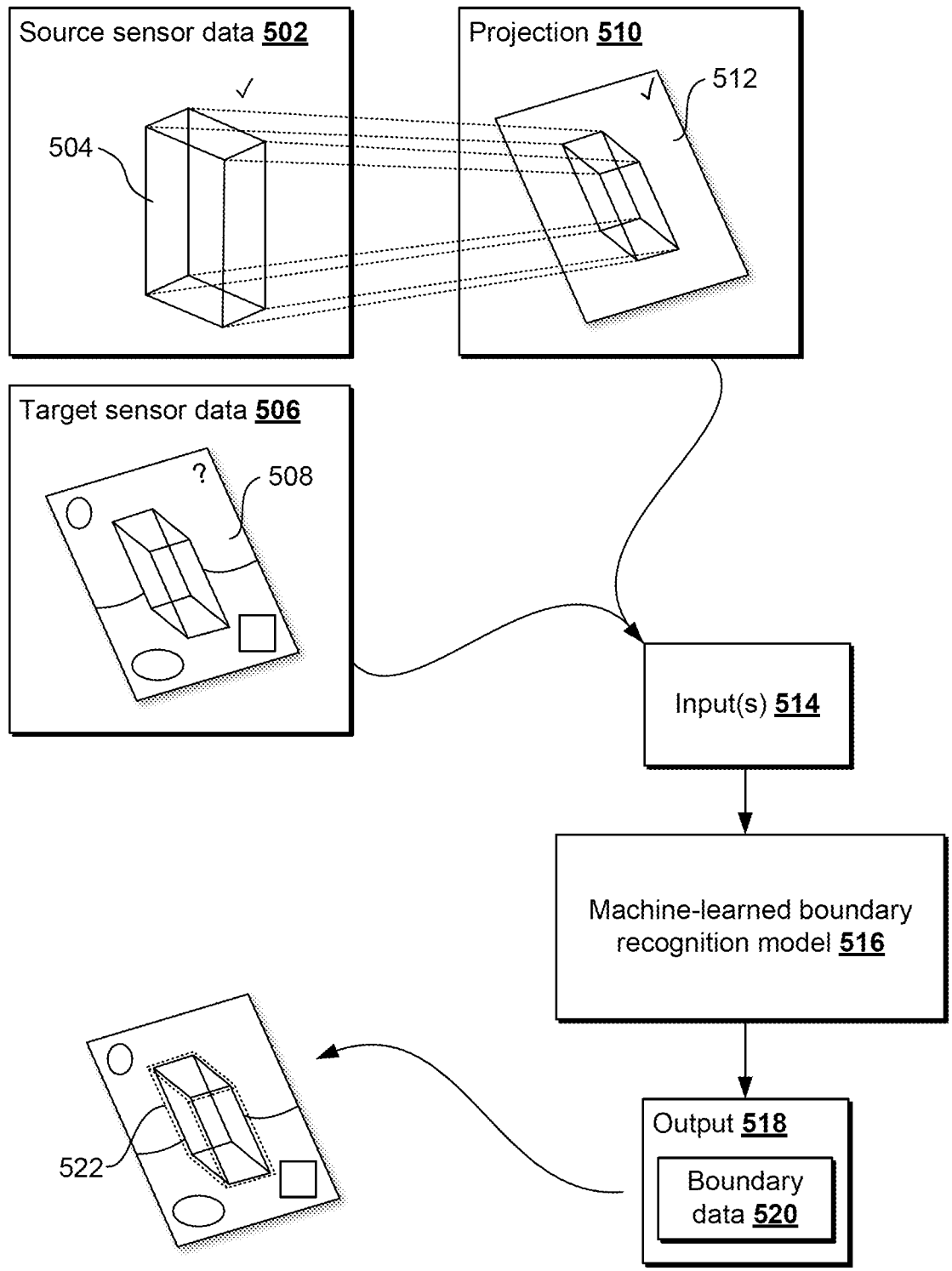
FIG. 5A is a block diagram of an example system for data annotation, according to some implementations of the present disclosure.

FIG. 5A depicts a block diagram of a ground truth sensor data model that can be implemented as part of a training pipeline. A training pipeline can include a collection of training instances, annotation of training instances, input of training instances to a subject model for training, evaluation of an output of the subject model with respect to the training instances or annotations thereof, updates to one or more parameters of the subject model based on the evaluation, etc.

Collection and annotation of training instances can include generating ground truth training instances from sensor data. Ground truth training instances can include sensor data (e.g., measured, synthesized, etc.) and annotations associated with the sensor data. The annotations can provide semantic information descriptive of the sensor data or a context thereof. Advantageously, example implementations according to the present disclosure can provide for leveraging annotations of already-annotated sensor data to more effectively and efficiently generate annotations for additional sensor data.

Source sensor data 502 can include sensor data descriptive of an object 504. The source sensor data 502 can be annotated or otherwise associated with labels providing semantic or other contextual information about the object 504. The source sensor data 502 may be raw sensor data (e.g., unprocessed sensor outputs, minimally processed sensor outputs, sensor outputs translated to raw measurements, etc.). The annotation data can describe boundaries of the object 504 (e.g., spatial boundaries, temporal boundaries, etc.) or other characteristics of the object 504 (e.g., size, shape, color, classification, heading, trajectory, or any other characteristic).

In some implementations, annotations can be manually assigned to source sensor data 502. For instance, source sensor data 502 can include annotations assigned in a labeling process in which a human operator provides an input to assign an annotation to the source sensor data 502. An operator can view the source sensor data and draw or otherwise arrange a bounding box around one or more areas of interest (e.g., regions of the source sensor data corresponding to a particular object). In some implementations, annotations can be automatically assigned. For instance, source sensor data 502 can be associated with annotations generated automatically or semi-automatically by a sensor data preprocessor (e.g., such as an image recognition component, a point cloud object recognition component, etc.).

The annotation(s) associated with source sensor data 502 can advantageously be leveraged for labeling the target sensor data 506. The target sensor data 506 can be of the same type or of a different type of data as the source sensor data 502. For example, the target sensor data 506 can be of lower dimensionality than the source sensor data 502. For example, the source sensor data 502 can include additional spatial or temporal dimensions as compared to the target sensor data 506. For example, the source sensor data 502 can include point cloud data, such as three-dimensional point cloud data (optionally mapped over a fourth temporal dimension), and the target sensor data 506 can include image data, such as two-dimensional image data.

In some implementations, the source sensor data 502 can include three-dimensional sensor data descriptive of a scene containing a particular object 504, and the target sensor data 506 can include a two-dimensional image 508 depicting the scene containing the same object 504. However, the image 508 can also include depictions of other objects in the scene. In some scenarios it may not be readily discernible that the object 504 is in the scene, or where the object 504 is within the scene. For example, the image 508 may not, in some implementations, contain annotation(s) indicating boundaries of the object 504 in the scene, or even that the object 504 is even present in the scene.

In some implementations, to aid identification of or boundaries for the object 504 in the target image 508, the source sensor data 502 can be processed with the target sensor data 506. For instance, the source sensor data 502 can be used to provide context for interpreting the target sensor data 506. In some implementations, an example system for data annotation can generate a projection 510 from the source sensor data 502, providing a projected image 512 of the object 504. The projected image 512 can be configured to share or approximate the reference frame of the target image 508. For example, the example system can generate the projected image 512 by projecting the source sensor data 502 into the reference frame of the target sensor data 506. Additionally, or alternatively, the source sensor data 502 can include previously-annotated images (e.g., already in the reference frame of the target sensor data 506), such as image frames of the object 504 captured at the same time or at different times from the capture of the target sensor data 506.

In some implementations, a projection 510 can be based on a known relationship between the source sensors (e.g., that output the source sensor data 502) and the target sensors (e.g., that output the target sensor data 506). For example, the source sensors can be positioned in a known orientation with respect to the target sensors. Using the known orientation, the system can generate a projection 510 of the source sensor data 502 into the reference frame of the target sensor data 506 (e.g., as if from the viewpoint of the target sensors). In some implementations, the relationship can be based on a hardware calibration, a software calibration, or both. In some implementations, the relationship can be based on metadata associated with the source sensor data 502 or the target sensor data 506. For instance, the source sensor data 502 or the target sensor data 506 can include metadata indicating a timestamp, heading, sensor identifier, or other data that can register the sensor data together. For instance, the source sensor data 502 can include a point cloud containing points detected by the source sensor at a source sensor location, and metadata associated with the source sensor data 502 can be descriptive of a relative location of the detected points with respect to the source sensor location (e.g., a heading, a distance, an orientation, etc.). Metadata associated with the source sensors or the target sensors can be descriptive of a target sensor location with respect to the source sensor location (e.g., a distance, an orientation, etc.). In this manner, for instance, a relative viewpoint or other transformation can be applied to the source sensor data 502 to generate a projection 510 that lies in the reference frame of the target sensor data 506.

In some implementations, a projected image 512 can inherit the annotation(s) of the parent source sensor data 502, and thus provide an annotated depiction of object 504 (e.g., symbolized by the check mark in FIG. 5A) that can be used as context or otherwise referenced when processing the target image 508. For example, one or more input(s) 514 to a machine-learned boundary recognition model 516 can be based on the target sensor data 506 and informed by the context of the source sensor data 502 (e.g., the data itself, a projection or other derivative or transformation thereof, etc.). For example, the input(s) 514 can include the target image 508 and the projected image 512. The machine-learned boundary recognition model 516 can, in some examples, learn to identify or locate the object 504 in the target image 508 as informed by reference to the annotated projected image 512.

The machine-learned boundary recognition model 516 can learn to generate an output 518. The output 518 can include data descriptive of the object 504 or its characteristics within the target image 508. The output 518 can include boundary data 520. Boundary data 520 can describe a bounding box 522 around the object 504 in the target image 508. For instance, boundary data 520 can describe one or more key points for defining a boundary box (e.g., corners, extrema in a given coordinate system, etc.). In this manner, for example, the machine-learned boundary recognition model 516 can leverage known sensor data recognized to be descriptive of the object 504 to generate annotations for target sensor data 506.

In some implementations, the machine-learned boundary recognition model 516 can include one or more image processing components. For example, the machine-learned boundary recognition model 516 can contain one or more pre-trained image processing components. The machine-learned boundary recognition model 516 can include an optionally pre-trained image recognition backbone (e.g., feature extractor) followed by one or more additional layers or model components. For instance, an object detection component can follow the backbone. In some implementations, the entire machine-learned boundary recognition model 516 can contain pre-trained weights. For instance, the image recognition backbone can be pre-trained, and a following object or boundary detection model can be trained from scratch, optionally while the image recognition backbone is fine-tuned. Additionally, or alternatively, parameters of the image recognition backbone can be frozen while the object or boundary detection model is trained.

Figure 5B:
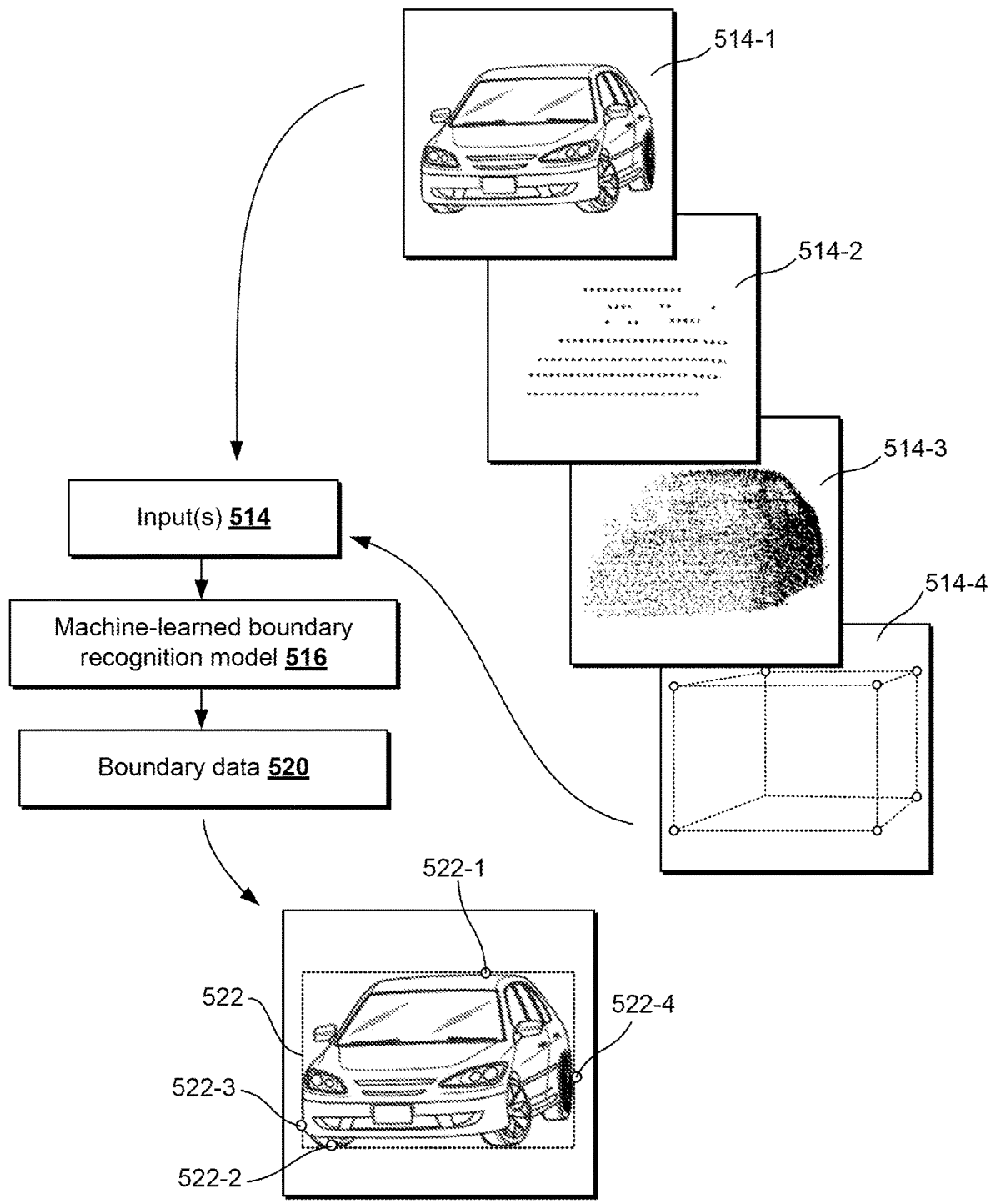
FIG. 5B is a block diagram of an example system for data annotation, according to some implementations of the present disclosure.

FIG. 5B illustrates an example system for data annotation that leverages annotated LIDAR data to generate annotations for an input image. Input(s) 514 can include a plurality of layers: a target image 514-1 of a vehicle; an annotated single-scan LIDAR point cloud 514-2 of the vehicle; an annotated multi-scan (e.g., time-aggregated) LIDAR point cloud 514-3 of the vehicle; and an initial three-dimensional bounding box 514-4 estimated from LIDAR data. In some implementations, the plurality of layers can include one or more previously-annotated images of the vehicle.

The single-scan LIDAR point cloud 514-2 can include a projection of a three-dimensional LIDAR point cloud into the reference frame of the target image 514-1. For example, the projection can include a transform operation from a viewpoint of the LIDAR sensor that captured the three-dimensional LIDAR point cloud to a viewpoint of the image sensor that captured the target image 514-1. The transform can be based on a known relationship between the LIDAR sensor and the image sensor (e.g., a calibrated mounting configuration on a shared platform, such as on an autonomous vehicle).

The multi-scan LIDAR point cloud 514-3 can include LIDAR points collected over time. A LIDAR sensor can perform ranging measurements at various points in time by scanning an environment in a cyclical fashion. In some implementations, different scans of the environment at different points in time can generate or reveal different information about the environment or objects therein. As a subject moves with respect to the LIDAR sensor, the scanning laser(s) of the LIDAR sensor can intersect and reflect from different surfaces, or different regions of the same surfaces, providing richer and more detailed measurements of the subject. In some implementations, multiple LIDAR scans can be aligned over time such that point cloud data for a detected object can be aggregated to provide a more detailed depiction of the object. For example, in an annotation process (e.g., manual annotation, semi-automatic annotation, automatic, etc.), point cloud data can be annotated over time. For instance, point cloud data depicting an environment can be recorded over a time period and contain point cloud datapoints descriptive of an object in the environment over that time period. At various intervals, annotations can be assigned to the point cloud data (e.g., a bounding box around point cloud datapoints descriptive of the object). Optionally annotations can be interpolated between the assigned time intervals (e.g., based on an estimated or predicted trajectory of the object). In some implementations, the annotations can be used to aggregate the point cloud datapoints associated with the object. For instance, point cloud datapoints associated with a particular annotation (e.g., associated with a particular object) can be collected into a single, more detailed point cloud.

In some implementations, the initial three-dimensional bounding box 514-4 can be estimated from the LIDAR data. For instance, the initial three-dimensional bounding box 514-4 can be estimated from extrema of the single-scan LIDAR point cloud 514-2 or of the multi-scan LIDAR point cloud 514-3.

In some implementations, the machine-learned boundary recognition model 516 can receive the input(s) 514 and generate boundary data 520 descriptive of a bounding box 522. The boundary data 520 can include coordinates of a plurality of key points. For instance, upper key point 522-1, lower key point 522-2, left key point 522-3, and right key point 522-4 can define boundaries of a bounding box 522 around the vehicle. For example, the plurality of key points can correspond to extrema of the vehicle when depicted in the reference frame of the input image 514-1. In some implementations, the machine-learned boundary recognition model 516 can receive the input(s) 514 and generate additional or other outputs. For instance, the machine-learned boundary recognition model 516 can output segmentation data (e.g., a segmentation map), recognition data, etc.

In some implementations, the boundary data 520 can be further refined after initial prediction. For example, the machine-learned boundary recognition model 516 can provide preprocessing for a manual or semi-automated data labeling pipeline, where the boundary data 520 can provide suggested key points for refinement by a user (or another processing model).

Figure 6:
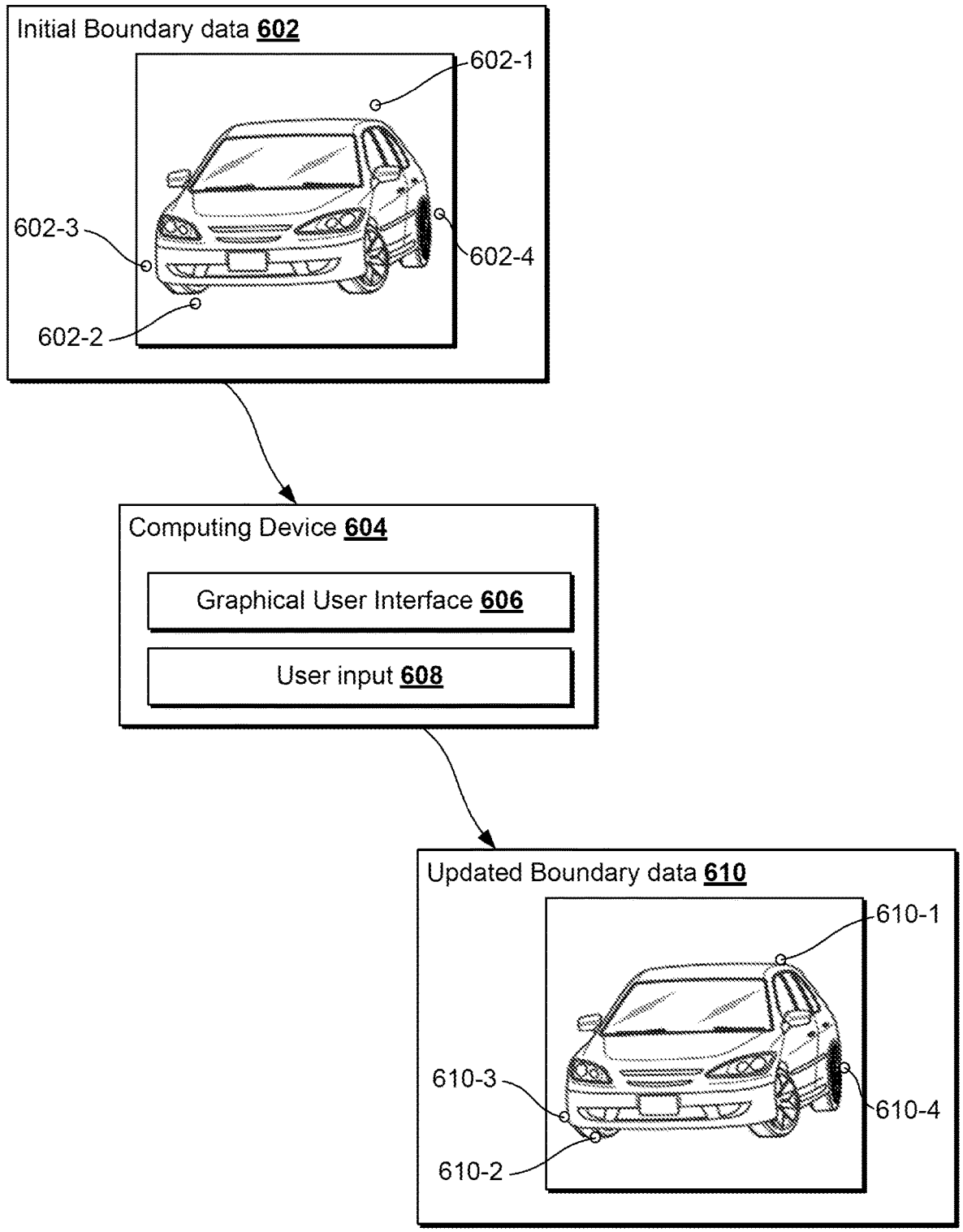
FIG. 6 is a block diagram of an example system for interactively refining data annotation, according to some implementations of the present disclosure.

For instance, as shown in FIG. 6, initial boundary data 602 can include suggested key points 602-1, 602-2, 602-3, and 602-4. A computing device 604 can render the suggested key points on a graphical user interface 606. A user input 608 can adjust the key point locations to generate updated boundary data 610 with updated key points 610-1, 610-2, 610-3, 610-4. In some implementations, a graphical user interface 606 can provide an interactive input interface for adjusting the key points. Interaction can include a tap, a click, a gesture, a voice command, or any other input type. In some implementations, a select-and-drag input can be used for adjustment of the key points. In some implementations, a selection of a new key point location can directly indicate the new key point location (e.g., without first selecting a representation of the key point at the prior location). In some implementations, a key point refinement process flow includes confirming the suggested key points 602-1, 602-2, 602-3, and 602-4 (e.g., by selection of a confirmation input interface of the graphical user interface 606), such that the updated key points 610-1, 610-2, 610-3, 610-4 are updated (explicitly or implicitly) by an increased confidence, even if remaining at the initially suggested locations.

In some implementations, an updated key point can be used to trigger re-prediction of the remaining key point(s). For instance, as part of a key point refinement process flow, a user can review suggested key points 602-1, 602-2, 602-3, and 602-4. Using the graphical user interface 606, a user input 608 can indicate that, for example, suggested key point 602-1 should be closer to the roof of the depicted vehicle (e.g., on the visual boundary of the roof of the depicted vehicle). For example, the user input 608 can include a selection of the visual boundary of the roof of the depicted vehicle, or a first selection of the suggested key point 602-1 and a second selection of the visual boundary of the roof, or a selection of the suggested key point 602-1 and a dragging motion to drag the key point 602-1 to the visual boundary of the roof. For instance, an updated position can be as shown by updated key point 610-1.

In some implementations, based on the updated location of the updated key point 610-1, the machine-learned boundary recognition model 516 can re-predict a set of key points. For instance, one or more updated key points (e.g., one or more of 610-1, 610-2, 610-3, 610-4, etc.) can be provided to the machine-learned boundary prediction model 516 as context (e.g., in a context vector, as a layer of an input data structure, etc.). In this manner, for instance, a refinement input for at least one suggested key point can trigger updates or refinements to other key points. In this manner, for example, a number of inputs for refining the suggested key points can advantageously be reduced, decreasing processing time and resource expenditure for generating annotations for the target sensor data.

In some implementations, based on the updated location of the updated key point 610-1, for example, the machine-learned boundary recognition model 516 can be re-trained to learn from the correction supplied by the update. For instance, a loss can be computed between the original location(s) of the key point(s) and the updated or corrected location(s) for updating one or more parameters of the machine-learned boundary recognition model 516.

Figure 7:
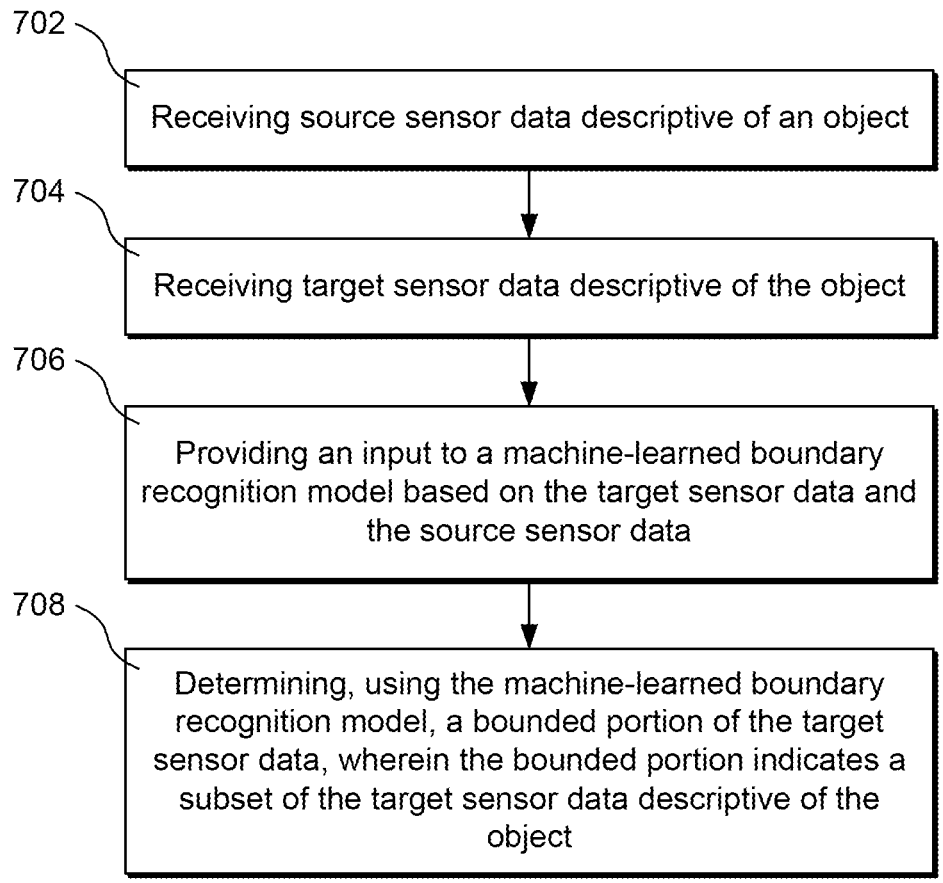
FIG. 7 is a flowchart of an example method for data annotation, according to some implementations of the present disclosure.

FIG. 7 is a flowchart of a method 700 for data annotation according to aspects of the present disclosure. One or more portion(s) of the method 700 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 700 can be performed by any (or any combination) of one or more computing devices. Moreover, one or more portion(s) of the method 700 can be implemented on the hardware components of the device(s) described herein (e.g., as in FIGS. 1, 2, 11, etc.), for example, to use sensor data for generating annotations. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, method 700 can include receiving source sensor data descriptive of an object. The source sensor data (e.g., source sensor data 502) can include multidimensional sensor data (e.g., spatial dimensions, temporal dimensions, etc.). The source sensor data can include annotations associating the source sensor data with the object. For instance, the source sensor data can include point cloud data descriptive of an object, with the point cloud datapoints tagged, labeled, or otherwise curated such that the point cloud datapoints are associated with the object.

At 704, method 700 can include receiving target sensor data descriptive of the object. The target sensor data (e.g., target sensor data 506) can include multidimensional sensor data (e.g., spatial dimensions, temporal dimensions, etc.). The target sensor data can optionally be of lower dimensionality than the source sensor data. For instance, the source sensor data can include three-dimensional point cloud data (or derivatives or transformations thereof), and the target sensor data can include two-dimensional image data. The target sensor data can lack an annotation that associates the target sensor data with the object or indicates characteristics of the object (e.g., boundaries, location within the target sensor data, etc.).

At 706, method 700 can include providing an input to a machine-learned boundary recognition model based on the target sensor data and the source sensor data. For example, a machine-learned boundary recognition model (e.g., model 516) can be configured to receive one or more inputs. In some implementations, the machine-learned boundary recognition model can be configured to receive a multichannel or multilayer input. In some implementations, a multichannel input can include a channel based on the target sensor data (e.g., a target image, such as target image 508) and a channel based on the source sensor data (e.g., a projection of the source sensor data into the target image reference frame). In some implementation, additional channels can be included, such as a channel with time-aggregated source sensor data (e.g., time-aggregated LIDAR scans) or a channel with an initial bounding box estimation.

At 708, method 700 can include determining, using the machine-learned boundary recognition model, a bounded portion of the target sensor data. The bounded portion of the target sensor data can indicate a subset of the target sensor data that is descriptive of the object. For instance, target sensor data can include an image of the object in an environment. The bounded portion can include a bounding box surrounding the object in the environment. The bounded portion can include a segmentation of the target sensor data (e.g., a segmentation map) that indicates the portion of the target sensor data (e.g., pixels, voxels, etc.) that is associated with the object (e.g., and not the environment).

Figure 8:
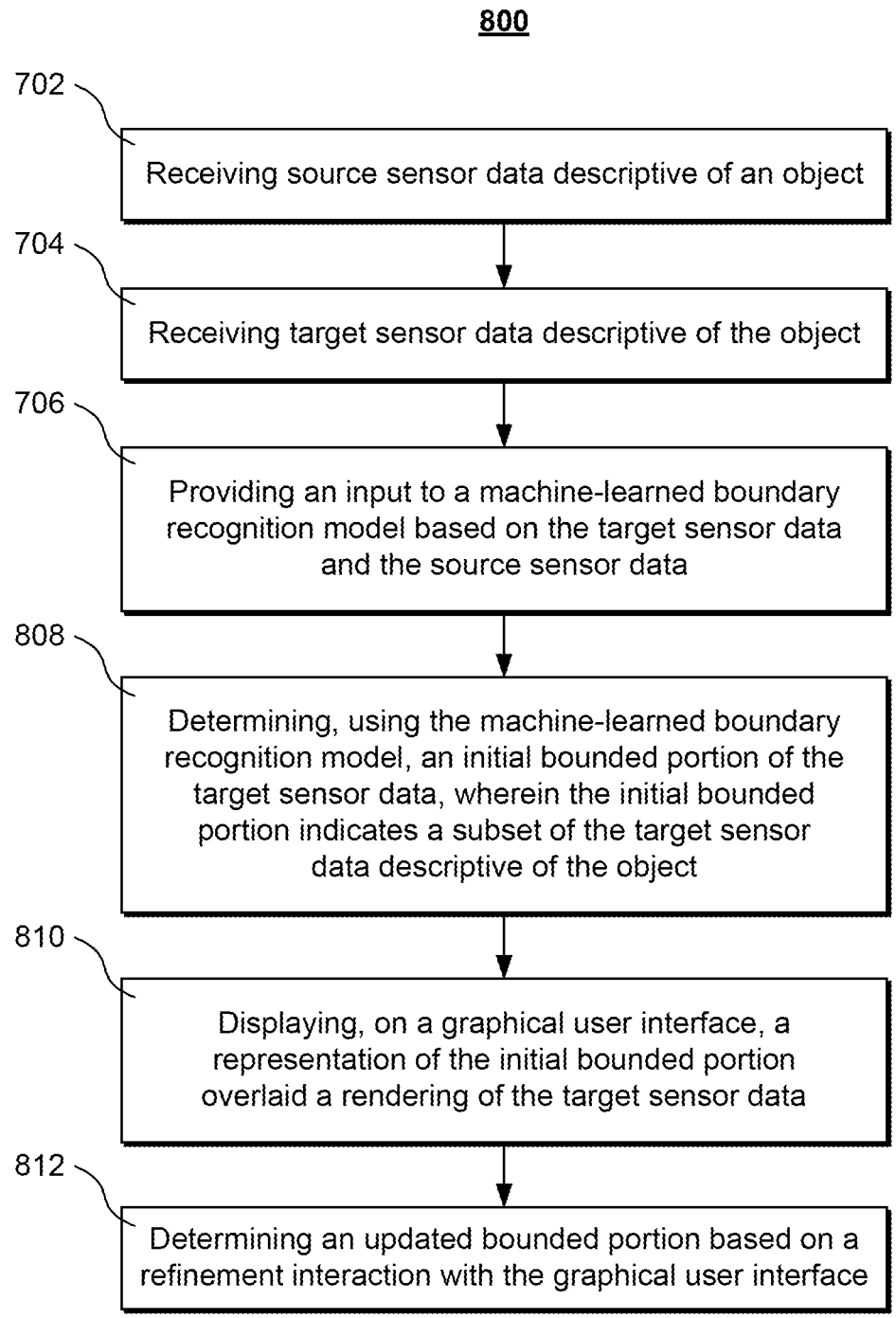
FIG. 8 is a flowchart of an example method for data annotation, according to some implementations of the present disclosure.

In some implementations, the bounded portion can be an initial bounded portion. For example, FIG. 8 is a flowchart of a method 800 for data annotation according to aspects of the present disclosure. One or more portion(s) of the method 800 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 800 can be performed by any (or any combination) of one or more computing devices. Moreover, one or more portion(s) of the method 800 can be implemented on the hardware components of the device(s) described herein (e.g., as in FIGS. 1, 2, 11, etc.), for example, to use sensor data for generating annotations. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

As shown in FIG. 8, method 800 includes operations 702-706. The method 800 also includes operations 808-812, which can be implemented as example sub-operations for determining a bounded portion of the target sensor data, for example, as operation 708 of method 700.

At 808, method 800 can include determining an initial bounded portion, as in method 700. The initial bounded portion can include one or more indications of an initial status or unconfirmed status.

At 810, method 800 can include displaying, on a graphical user interface, a representation of the initial bounded portion overlaid a rendering of the target sensor data. For example, the representation of the initial bounded portion can include a plurality of key points displayed as markers on a graphical user interface (e.g., interface 606). The representation can include a bounding box drawn through (e.g., as constrained by) the plurality of key points. The representation can be rendered over the target sensor data, such as by drawing a bounding box or boundary markers on an image of the object, or by applying shading or other visual indicators of a segment of the image corresponding to the object.

At 812, method 800 can include determining an updated bounded portion based on a refinement interaction with the graphical user interface. For instance, the refinement interaction (e.g., user input 608) can include a selection of a key point, a relocation of a key point, a confirmation indication, etc. In some implementations, the updated bounded portion can be directly formed from the update input (e.g., directly including the updated key point location(s), etc.). In some implementations, the updated bounded portion can be based on a second output of the machine-learned boundary recognition model (or an output of a second machine-learned boundary prediction model) that is informed by the context of the refinement interaction (e.g., as a contextual input, etc.). The updated bounded portion can include one or more indications of an updated or refined status or a confirmed status.

Figure 9:
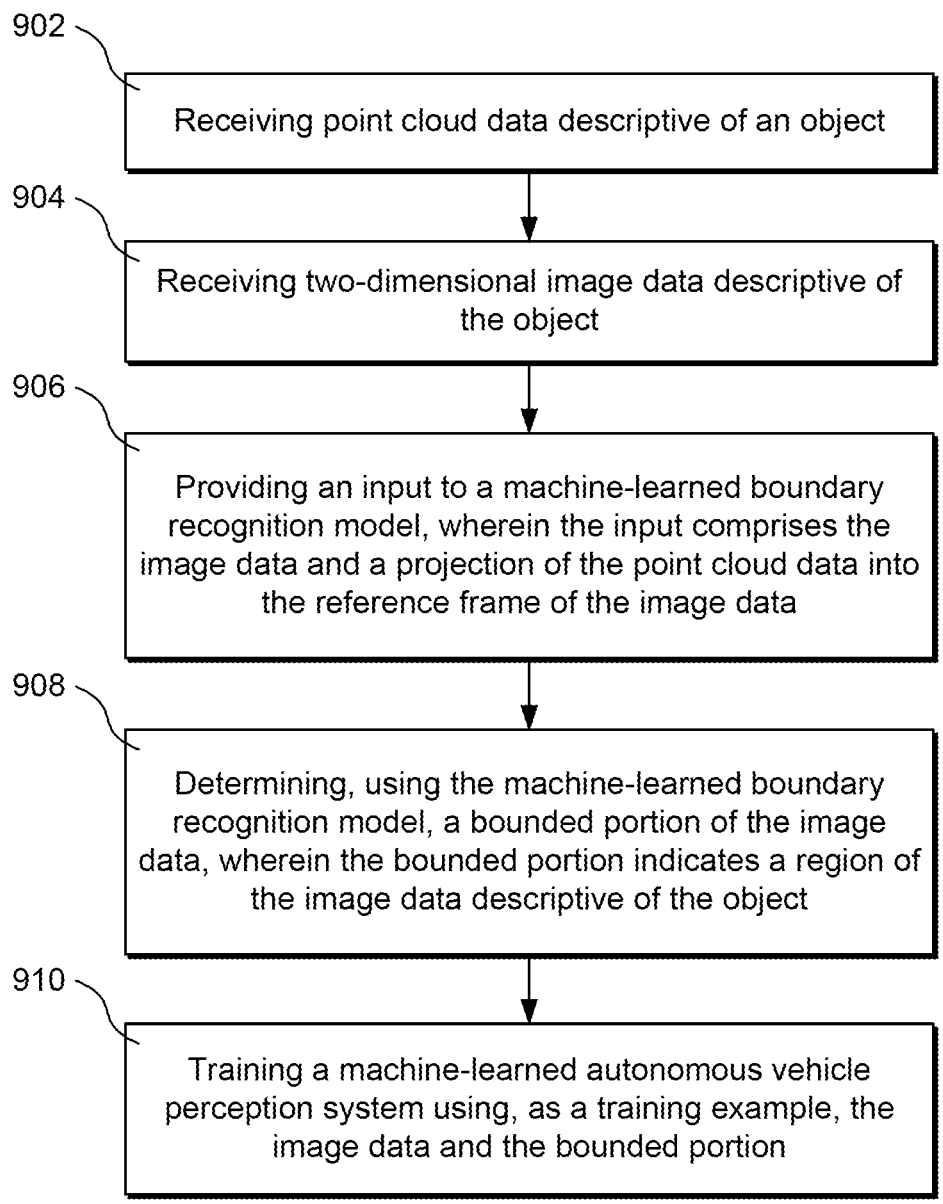
FIG. 9 is a flowchart of an example method for data annotation, according to some implementations of the present disclosure.

In some implementations, data annotation according to aspects of the present disclosure can provide for generating annotations for two-dimensional image data based on three-dimensional point cloud data (optionally aggregated over a fourth dimension in time). FIG. 9 depicts a flowchart of a method 900 for data annotation according to aspects of the present disclosure. One or more portion(s) of the method 900 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 900 can be performed by any (or any combination) of one or more computing devices. Moreover, one or more portion(s) of the method 900 can be implemented on the hardware components of the device(s) described herein (e.g., as in FIGS. 1, 2, 11, etc.), for example, to use sensor data for generating annotations. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 902, method 900 can include receiving point cloud data descriptive of an object. The point cloud data can include LIDAR data, RADAR data, or other spatial representations of measured or synthesized objects. In some implementations, the point cloud data can be annotated to indicate or otherwise record an association with the object (e.g., a label).

At 904, method 900 can include receiving two-dimensional image data descriptive of the object. For example, two-dimensional image data can include multichannel image data having two spatial dimensions (e.g., three color channels recording pixel values arranged in a planar coordinate grid). In some implementations, the image data can lack annotations to indicate or otherwise record an association with the object (e.g., a label).

At 906, method 900 can include providing an input to a machine-learned boundary recognition model (e.g., model 516). The input can include, for example, the image data. In some implementations, the input can also include the point cloud data, or derivatives or transforms thereof. For instance, the input can include a projection of the point cloud data into a reference frame of the image data. For instance, the point cloud data can depict an object in three dimensions, and a projection of the point cloud data can depict the object as viewed from the viewpoint of the sensor(s) that captured the image data. In this manner, the projection can inherit the annotations of the point cloud data and provide an annotated contextual input for generating annotations for the image data.

At 908, method 900 can include determining a bounded portion of the image data as described above with respect to methods 700 and 800.

At 910, method 900 can include training a machine-learned autonomous vehicle perception system using, as a training example, the image data and the bounded portion. For example, the bounded portion can form an annotation for the image data, such that the image data can provide a ground truth training example for training a machine-learned perception system (e.g., an object detection component) to detect an object in the image data and determine the boundaries of the object. In this manner, for example, the systems and methods for data annotation described herein can, in some implementations, form part of a training pipeline for machine vision systems (e.g., for autonomous vehicles).

Figure 10:
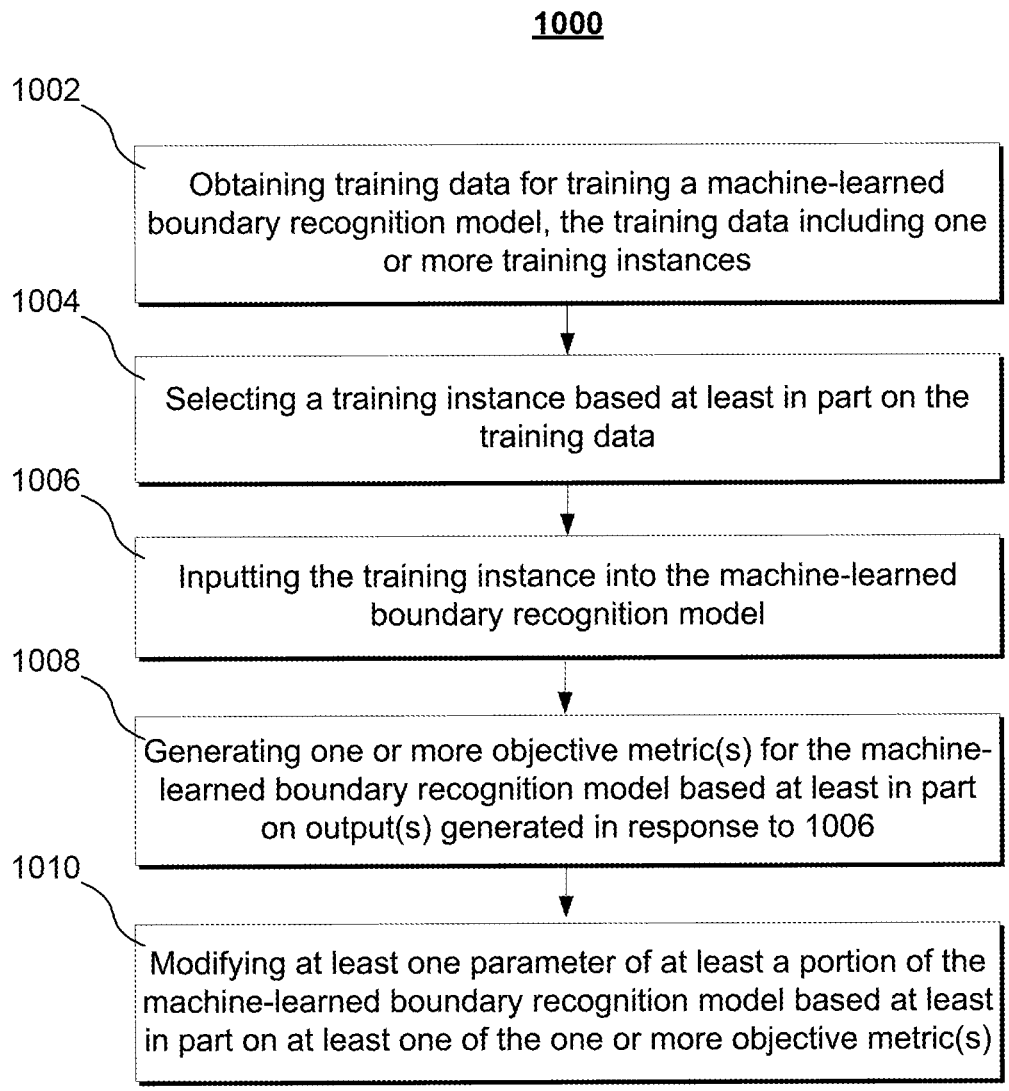
FIG. 10 is a flowchart of an example method for training a machine-learned model for data annotation, according to some implementations of the present disclosure.

FIG. 10 depicts a flowchart of a method 1000 for data annotation according to aspects of the present disclosure. One or more portion(s) of the method 1000 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 1000 can be performed by any (or any combination) of one or more computing devices. Moreover, one or more portion(s) of the method 1000 can be implemented on the hardware components of the device(s) described herein (e.g., as in FIGS. 1, 2, 11, etc.), for example, to use sensor data for generating annotations. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1002, the method 1000 can include obtaining training data for training a machine-learned boundary recognition model (e.g., one or more components of model 516). For example, a computing system can obtain (e.g., receive, generate, etc.) the training data for training the machine-learned boundary recognition model. The training data can include a plurality of training instances, such as pre-recorded inputs (e.g., perception data from ranging sensors, image sensors, etc.) corresponding to reference or "ground truth" boundary data (e.g., supervised or semi-supervised training data, such as images and points clouds with labeled boundaries).

The training data can be collected using one or more autonomous platforms (e.g., autonomous platform 110) or the sensors thereof as the autonomous platform is within its environment. By way of example, the training data can be collected using one or more autonomous vehicle(s) (e.g., autonomous platform 110, autonomous vehicle 310, autonomous vehicle 350, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.). For instance, in some implementations, a plurality of images can be scaled for training and evaluation.

At 1004, the method 1000 can include selecting a training instance based at least in part on the training data. For example, a computing system can select the training instance based at least in part on the training data.

At 1006, the method 1000 can include inputting the training instance into the machine-learned boundary recognition model. For example, a computing system can input the training instance into the machine-learned boundary recognition model (e.g., model 516).

At 1008, the method 1000 can include generating one or more loss metric(s) and/or one or more objective(s) for the machine-learned boundary recognition model based on output(s) of at least a portion of the machine-learned boundary recognition model in response to inputting the training instance (e.g., at 1006). For example, a computing system can generate the loss metric(s) and/or objective(s) for the machine-learned boundary recognition model based on the output(s) of at least a portion of the machine-learned boundary recognition model in response to the training instance. The loss metric(s), for example, can include a loss as described herein based at least in part on a distance metric between predicted boundaries (e.g., predicted key points, predicted segmentation maps, etc.) for an object in training sensor data (e.g., a training image) and a set of ground truth boundaries associated with the training image.

At 1010, the method 1000 can include modifying at least one parameter of at least a portion of the machine-learned boundary recognition model based at least in part on at least one of the loss metric(s) and/or at least one of the objective(s). For example, a computing system can modify at least a portion of the machine-learned boundary recognition model based at least in part on at least one of the loss metric(s) and/or at least one of the objective(s).

In some implementations, the machine-learned boundary recognition model can be trained in an end-to-end manner. For example, in some implementations, the machine-learned boundary recognition model can be fully differentiable.

Figure 11:
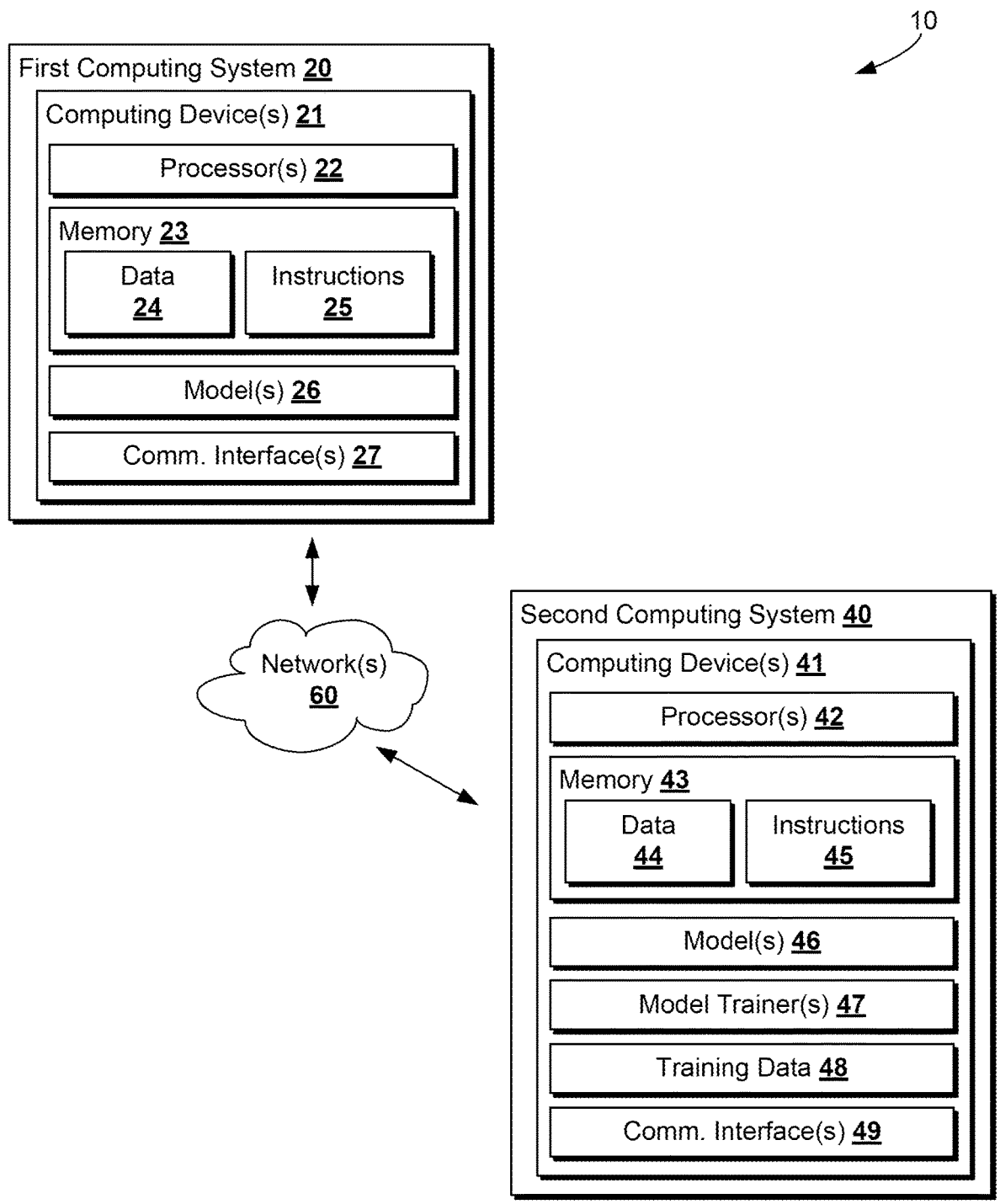
FIG. 11 is a block diagram of an example computing system for data annotation, according to some implementations of the present disclosure.

FIG. 11 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for data annotation (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.)

to perform (e.g., with the computing device(s) 21, the first computing system 20, or other system(s) having processors executing the instructions) any of the operations, functions, or methods/processes (or portions thereof) described herein. For example, operations can include generating boundary data for annotating sensor data, such as for implementing part of a training pipeline for machine-learned machine vision systems.

In some implementations, the first computing system 20 can store or include one or more models 26. In some implementations, the models 26 can be or can otherwise include one or more machine-learned models (e.g., a machine-learned boundary recognition model, a machine-learned perception model, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, generating boundary data for annotating sensor data, such as for implementing part of a training pipeline for machine-learned machine vision systems.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally or alternatively, the model(s) 26 at the first computing system 20, the second computing system 40 can include one or more models 46. As examples, the model(s) 46 can be or can otherwise include various machine-learned models (e.g., a machine-learned boundary recognition model, a machine-learned perception model, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48 by annotating target sensor data (e.g., image data) by leveraging previously annotated source sensor data (e.g., point cloud data). For instance, the second computing system 40 can implement methods 600, 700, 800, or 1000 according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 11 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method for data annotation for training machine perception models, comprising:
(a) receiving source sensor data descriptive of an object, the source sensor data having a source reference frame of at least three dimensions, wherein the source sensor data comprises annotated data associated with the object, the source sensor data comprising point cloud data collected by aggregating a plurality of ranging measurements over time;
(b) receiving target sensor data descriptive of the object, the target sensor data having a target reference frame of at least two dimensions, the target sensor data comprising two-dimensional image data;

(c) providing an input to a machine-learned boundary recognition model, wherein the input comprises the target sensor data and a projection of the source sensor data into the target reference frame; and (d) determining, using the machine-learned boundary recognition model, a bounded portion of the target sensor data, wherein the bounded portion indicates a subset of the target sensor data descriptive of the object.

2. The computer-implemented method of claim 1, wherein the bounded portion corresponds to a bounding shape around a depiction of the object in the target sensor data.

3. The computer-implemented method of claim 1, wherein the bounded portion corresponds to a plurality of key points.

4. The computer-implemented method of claim 1, wherein
a first channel of the input corresponds to the target sensor data, and
a second channel of the input corresponds to the projection.

5. The computer-implemented method of claim 4, wherein a third channel of the input corresponds to a source bounding shape around a depiction of the object in the source sensor data.

6. The computer-implemented method of claim 1, comprising:
(e) displaying, on a graphical user interface, a representation of the bounded portion overlaid a rendering of the target sensor data, wherein the graphical user interface is configured to receive a refinement input to update the bounded portion.

7. The computer-implemented method of claim 1, comprising:
(f) storing a data record associating the target sensor data and the source sensor data with the object.

8. The computer-implemented method of claim 1, wherein the machine-learned boundary recognition model comprises an image recognition model backbone.

9. A computing system for an autonomous vehicle control system training pipeline, the computing system comprising:
one or more processors; and
one or more non-transitory computer-readable media storing instructions executable to cause the one or more processors to perform operations, the operations comprising:
(a) receiving source sensor data descriptive of an object, the source sensor data having a source reference frame of at least three dimensions, wherein the source sensor data comprises annotated data associated with the object, the source sensor data comprising point cloud data collected by aggregating a plurality of ranging measurements over time;
(b) receiving target sensor data descriptive of the object, the target sensor data having a target reference frame of at least two dimensions, the target sensor data comprising two-dimensional image data;
(c) providing an input to a machine-learned boundary recognition model, wherein the input comprises the target sensor data and a projection of the source sensor data into the target reference frame; and
(d) determining, using the machine-learned boundary recognition model, a bounded portion of the target sensor data, wherein the bounded portion indicates a subset of the target sensor data descriptive of the object.

10. The computing system of claim 9, wherein the bounded portion corresponds to a plurality of key points.

11. The computing system of claim 9, wherein
a first channel of the input corresponds to the target sensor data, and
a second channel of the input corresponds to the projection.

12. The computing system of claim 11, wherein a third channel of the input corresponds to a source bounding shape around a depiction of the object in the source sensor data.

13. The computing system of claim 9, the operations comprising:
(e) displaying, on a graphical user interface, a representation of the bounded portion overlaid a rendering of the target sensor data, wherein the graphical user interface is configured to receive a refinement input to update the bounded portion.

14. The computing system of claim 9, the operations comprising:
(f) storing a data record associating the target sensor data and the source sensor data with the object.

15. The computing system of claim 9, wherein the machine-learned boundary recognition model comprises an image recognition model backbone.

16. An autonomous vehicle control system for an autonomous vehicle, the autonomous vehicle control system comprising:
one or more processors; and
one or more non-transitory computer-readable media storing instructions executable to cause the one or more processors to perform operations, the operations comprising:
(a) obtaining sensor data descriptive of an environment of the autonomous vehicle; and
(b) determining, based on the sensor data and using a machine-learned perception model, a presence of an object in the environment, wherein the machine-learned perception model was trained to perceive objects using training data generated by
(c) receiving training source sensor data descriptive of a training object, the training source sensor data having a training source reference frame of at least three dimensions, wherein the training source sensor data comprises annotated training data associated with the training object, the training source sensor data comprising point cloud data collected by aggregating a plurality of ranging measurements over time;
(d) receiving training target sensor data descriptive of the training object, the training target sensor data having a training target reference frame of at least two dimensions, the training target sensor data comprising two-dimensional image data;
(e) providing a training input to a machine-learned boundary recognition model, wherein the input comprises the training target sensor data and a projection of the training source sensor data into the training target reference frame; and
(f) determining, using the machine-learned boundary recognition model, a bounded portion of the training target sensor data, wherein the bounded portion indicates a subset of the training target sensor data descriptive of the training object.

17. A computer-implemented method for data annotation for training machine perception models, comprising:
(a) receiving source sensor data descriptive of an object, the source sensor data having a source reference frame of at least three dimensions, wherein the source sensor data comprises annotated data associated with the object;

(b) receiving target sensor data descriptive of the object, the target sensor data having a target reference frame of at least two dimensions;

(c) providing an input to a machine-learned boundary recognition model, wherein the input comprises the target sensor data and a projection of the source sensor data into the target reference frame;

(d) determining, using the machine-learned boundary recognition model, a bounded portion of the target sensor data, wherein the bounded portion indicates a subset of the target sensor data descriptive of the object; and (e) displaying, on a graphical user interface, a representation of the bounded portion overlaid a rendering of the target sensor data, wherein the graphical user interface is configured to receive a refinement input to update the bounded portion.

18. The computer-implemented method of claim 17, wherein the bounded portion corresponds to a bounding shape around a depiction of the object in the target sensor data.

19. The computer-implemented method of claim 17, wherein the bounded portion corresponds to a plurality of key points.

20. The computer-implemented method of claim 17, comprising:

(f) storing a data record associating the target sensor data and the source sensor data with the object.

21. The computer-implemented method of claim 17, wherein the machine-learned boundary recognition model comprises an image recognition model backbone.

22. A computing system for an autonomous vehicle control system training pipeline, the computing system comprising:

one or more processors; and one or more non-transitory computer-readable media storing instructions executable to cause the one or more processors to perform operations, the operations comprising:

(a) receiving source sensor data descriptive of an object, the source sensor data having a source reference frame of at least three dimensions, wherein the source sensor data comprises annotated data associated with the object;

(b) receiving target sensor data descriptive of the object, the target sensor data having a target reference frame of at least two dimensions;

(c) providing an input to a machine-learned boundary recognition model, wherein the input comprises the target sensor data and a projection of the source sensor data into the target reference frame;

(d) determining, using the machine-learned boundary recognition model, a bounded portion of the target sensor data, wherein the bounded portion indicates a subset of the target sensor data descriptive of the object; and (e) displaying, on a graphical user interface, a representation of the bounded portion overlaid a rendering of the target sensor data, wherein the graphical user interface is configured to receive a refinement input to update the bounded portion.

23. The computing system of claim 22, wherein the bounded portion corresponds to a bounding shape around a depiction of the object in the target sensor data.

24. The computing system of claim 22, wherein the bounded portion corresponds to a plurality of key points.

25. The computing system of claim 22, comprising:

(f) storing a data record associating the target sensor data and the source sensor data with the object.

26. The computing system of claim 22, wherein the machine-learned boundary recognition model comprises an image recognition model backbone.

* * * * *